United States Patent [19]

Kaluzhsky et al.

[11] Patent Number: 4,518,571

[45] Date of Patent: May 21, 1985

[54] PROCESS FOR DESILICATION OF ALUMINATE LIQUORS IN THE PRODUCTION OF ALUMINA

[75] Inventors: Nikolai A. Kaluzhsky; Viktor M. Sizyakov; Vladimir V. Andreev; Alexei I. Alexeev, all of Leningrad; Khoren A. Badaliants; Isaak A. Zatulovsky, both of Pikalevo Leningradskoi; Valentin I. Korneev, Leningrad; Ivan M. Kostin, Pikalevo Leningradskoi, all of U.S.S.R.

[73] Assignees: Vsesojuzny Nauchno-Issledovatelsky I Proektny Institut Aljuminievo Magnievoi I Elektrodnoi Promyshlennosti; Leningradsky Tekhnologichesky Institut Imeni Lensoveta, both of Leningrad, U.S.S.R.

[21] Appl. No.: 583,944

[22] Filed: Feb. 27, 1984

[51] Int. Cl.$^3$ ............................................. C01F 7/04
[52] U.S. Cl. .................................... 423/119; 423/122
[58] Field of Search ................................ 423/119, 122

[56] References Cited

PUBLICATIONS

"Metallurgiya" Publishing House, 1978, pp. 252–254.

Primary Examiner—Herbert T. Carter
Attorney, Agent, or Firm—Ladas & Parry

[57] ABSTRACT

The process consists of two desilication stages. In the first stage the aluminate liquor resulting from digestion of the sinter is subjected to an autoclave treatment to remove the major portion of impurities of $SiO_2$ and $Fe_2O_3$. In the second stage the aluminate liquor is treated with a desilication agent comprising a lime pulp containing oxides $CaO$, $Al_2O_3$, $SiO_2$, $Fe_2O_3$, $Na_2O$ in a mass ratio of $CaO:(SiO_2+Fe_2O_3)=1,000$ to $5,000:1$ and $Na_2Al_2O_3=0.25-0.60:1$, wherein $CaO$ is active, $Na_2O$—in the carbonate form. This lime pulp is employed in such an amount as to ensure the content of active $CaO$ in the aluminate liquor within the range of from 5 to 10 g/l. The impurities of $SiO_2$ and $Fe_2O_3$ present in the liquor pass into the solid phase with the formation of calcium hydrogarnets of the formula $3\ CaO(Al,Fe)_2O_3\ mSiO_2(6-2m)H_2O$, wherein $m=0.01-0.5$ which are separated as a mud.

3 Claims, No Drawings

PROCESS FOR DESILICATION OF ALUMINATE LIQUORS IN THE PRODUCTION OF ALUMINA

FIELD OF THE INVENTION

The present invention relates to the production of alumina by sintering and, more specifically, to a process for desilication of aluminate liquors.

The basic starting materials for the production of alumina are bauxites. However, during the recent years the reserves of bauxites tend to be exhausted and the alumina-production industry in some countries is forced to shift to processing of non-bauxite raw materials, in particular alkaline aluminosilicates which occur in vast deposits.

In processing of alkaline aluminosilicate starting materials by sintering, the quality of the resulting alumina is determined by the content of impurities of $SiO_2$ and $Fe_2O_3$ therein which depends on the degree (depth) of desilication of aluminate liquors obtained from digestion of sinters, i.e. purification of aluminate liquors from $SiO_2$ and $Fe_2O_3$. The lesser the amount of $SiO_2$ and $Fe_2O_3$ in alumina, the better is its quality. In other words, the more comprehensive (deeper) the process of desilication of aluminate liquors, the higher is the quality of the resulting alumina.

BACKGROUND OF THE INVENTION

Known in the art is a two-stage process for desilication of aluminate liquors. In the first stage an aluminate liquor is treated in an autoclave to recover $SiO_2$ in the form is alkaline aluminosilicates. In the second stage of desilication lime is introduced into the aluminate liquor, $SiO_2$ is precipitated from the liquor in the form of calcium hydrogarnets of the formula: $3CaO.Al_2O_3.mSiO_2(6-2m).H_2O$, wherein $m=0.1-0.2$ (cf. Liner A.I. et al. "Alumina Production", Moscow, "Metallurgiya" Publishing House, 1978, p.252-254). However, the depth of desilication is insufficient, since it is still impossible to sufficiently fully remove the impurities of $SiO_2$ and $Fe_2O$ and produce a high-quality alumina.

Known in the art is a process, wherein lime is preliminarily mixed with the aluminate liquor and this mixture is used as a desilication agent (cf. USSR Inventor's Certificate No.325811). Though this process makes it possible to increase the degree of desilication, the content of impurities of $SiO_2$ and $Fe_2O_3$ in the aluminate liquor remains still high, wherefore quality of the thus-produced alumina does not correspond the high-purity grade.

OBJECT OF THE INVENTION

It is an object of the present invention to provide such a process for desilication of aluminate liquors which would make it possible to improve desilication of aluminate liquors through a more full removal of impurities of $SiO_2$ and $Fe_2O_3$ therefrom.

SUMMARY OF THE INVENTION

This object is accomplished by a process for desilication of aluminate liquors in the production of alumina which comprises two desilication stages:

(1) in the first stage the aluminate liquor resulting from digestion of sinter is subjected to a treatment at a temperature of from 150° to 170° C. under a pressure of 6 to 12 atm to remove the major portion of impurities of $SiO_2$ and $Fe_2O_3$ which are separated in the form of an aluminosilicate mud;

(2) in the second stage the aluminate liquor is subjected to a treatment with a desilication agent; as a desilication agent use is made of a lime pulp containing oxides CaO, $Al_2O_3$, $SiO_2$, $Fe_2O_3$, $Na_2O$ in a mass ratio $CaO:(SiO_2+Fe_2O_3)=1,000-5,000:1$ and $Na_2O:Al_2O_3=0.25-0.60:1$, wherein CaO is active, $Na_2O$ is in the carbonate form, taken in an amount ensuring the content of active CaO in the aluminate liquor within the range of 5 to 10 g/l, the remaining portion of impurities $SiO_2$ and $Fe_2O_3$ is removed by conversion thereof into a solid phase with the formation of calcium hydrogarnets of the formula:

$$3CaO(Al,Fe)_2O_3.mSiO_2.(6-2m).H_2O$$

wherein $m=0.01-0.5$ which is separated in the form of a mud.

The second stage of desilication is conducted at a temperature of from 60° to 95° C. under a normal pressure.

The above-mentioned lime pulp is obtained by mixing a lime milk containing 150-200 g/l of CaO with an aluminate liquor obtained from the second stage of desilication to obtain CaO content in the pulp of 70-90 g/l at the mass ratio of $CaO:(SiO+Fe_2O_3)=1,000-5,000:1$ and $Na_2O:Al_2O_3=0.25-0.60:1$, wherein CaO is active, $Na_2O$—carbonate form.

The process according to the present invention has the following advantages. The present invention makes it possible to increase the degree of desilication of aluminate liquors from impurities of $SiO_2$ and $Fe_2O_3$ and reduce their content respectively to 0.010 g/l of $SiO_2$ and to 0.008 g/l of $Fe_2O_3$.

The present invention makes it also possible to obtain, in the second stage of desilication, a mud containing 40-95% of calcium hydrogarnet suitable for the production of cement employed in foundry engineering.

The present invention makes it possible to improve quality of the desired product—alumina due to a reduced content of impurities of $SiO_2$ and $Fe_2O_3$ therein.

The above-mentioned advantages of the present invention will become more fully apparent from the following detailed description.

DETAILED DESCRIPTION OF THE INVENTION

As it has been already mentioned hereinbefore, the present invention relates to a process for desilication of aluminate liquors in the production of alumina. By the term "aluminate liquor" as used hereinafter a liquor is meant containing sodium aluminate $Na_2O.Al_2O_3$ resulting from the production of alumina from alkaline aluminosilicates by way of sintering.

According to this process the starting ore, for example alkaline aluminosilicates are crushed together with limestone and sintered in a rotary kiln at a temperature of 1,300° to 1,350° C. The resulting sinter is subjected to digestion and the thus-obtained aluminate liquor is separated from the mud. This aluminate liquor contains 2-3 g/l of $SiO_2$ and 1-2 g/l of $Fe_2O_3$ which are to be removed, since they impair quality of the final product—alumina. To this end, the aluminate liquor is delivered to desilication, i.e. purification from $SiO_2$ and $Fe_2O_3$ dissolved therein.

The process of desilication of aluminate liquors is conducted in two stages. In the first stage the aluminate liquor is treated in a series of autoclaves at a temperature of 150°-170° C. under a pressure of from 6 to 12 atm. In this stage the major portion of impurities $SiO_2$ and $Fe_2O_3$ is removed by combining them into alkaline alumosilicates with the formation of a suspension which is subjected to filtration. After the filtration the recovered aluminosilicate slime is delivered to the initial operation of the process, while the aluminate liquor containing 0.1-0.3 g/l of $SiO_2$ and 0.15-0.60 g/l of $Fe_2O_3$ is delivered to the second stage of desilication.

In the second stage of desilication the aluminate liquor is treated with a desilication agent; as a desilication agent use is made of a lime pulp containing the following oxides: CaO, $Al_2O_3$, $SiO_2$, $Fe_2O_3$, $Na_2O$ in the mass ratio $CaO:(SiO_2+Fe_2O_3)=1{,}000\text{-}5{,}000{:}1$ and $Na_2O{:}Al_2O_3=0.25\text{-}0.60{:}1$, wherein CaO is active, $Na_2O$ is in the carbonate form. This lime pulp is employed in such an amount that the content of active CaO in the aluminate liquor be equal to 5-10 g/l. The desilication process is conducted at a temperature of 60°-95° C. for 1-4 hours.

In the second stage of desilication there is attained a deeper purification of the aluminate liquor from the remaining impurities $SiO_2$ and $Fe_2O_3$. This is explained by the fact that upon interaction of the above-mentioned lime pulp with the aluminate liquor, calcium hydroaluminates and hydrocarboaluminates incorporated in the pulp react with the impurities $SiO_2$ and $Fe_2O_3$ dissolved in the aluminate liquor with the formation of a cubic form of calcium hydrogarnets of the formula: $3CaO(Al, Fe)_2O_3.mSiO_2(6-2m).H_2O$, wherein $m=0.01\text{-}0.5$, and in this manner the impurities pass into the solid phase in the form of a mud.

The suspension is filtered and an aluminate liquor is obtained which contains 0.01-0.02 g/l of $SiO_2$ and 0.008-0.01 g/l of $Fe_2O_3$ and a mud containing 40 to 95% by mass of a cubic calcium hydrogarnet of the above-given formula.

A pure aluminate liquor resulting from the second desilication stage is delivered to a further processing to alumina while the recovered hydrogarnet mud is passed to the production of a foundry cement.

The lime pulp employed as the desilication agent in the second stage of desilication of the process according to the present invention is produced in the following manner. First of all, a lime milk is prepared. To this end, lime is slaked by the aluminate liquor taken from the second stage of desilication. The slaking is effected to obtain a lime milk with a content of active CaO of 150-200 g/l. On completion of slaking the undercalcined particles and non-slaked grains are separated. The resulting lime milk is mixed with a pure aluminate liquor in such proportions that the content of active CaO be within the range of 70-90 g/l at the mass ratio of active $CaO:(SiO_2+Fe_2O_3)=1{,}000\text{-}5{,}000{:}1$ and $Na_2O$ (carbonate)$:Al_2O_3=0.25\text{-}0.60{:}1$. This ratio of oxides ensures the formation of hexagonal calcium hydroaluminates and hydrocarbo-aluminates. When this pulp in the second stage of desilication is introduced into the aluminate liquor, these calcium hydroaluminates and hydrocarboaluminates react with iron and silicon oxides with the formation of a cubic calcium hydrogarnet of the formula: $3CaO(Al, Fe)_2O_3.mSiO_2(6-2m).H_2O$, wherein $m=0.01\text{-}0.5$ which is recovered as a mud. When the abovespecified amounts are taken beyond the range defined hereinabove, this reaction will not be realized. Thus, at a ratio of active $CaO:(SiO_2+Fe_2O_3)$ in the pulp below 1,000 and $Na_2O$ (carbonate)$:Al_2O_3$ below 0.25 there occurs the formation of a cubic, not hexagonal, form of calcium hydroaluminate which does not make it possible to obtain calcium hydrogarnets of the above-given formula in the second stage of desilication. At a ratio of oxides CaO active: $(SiO_2+Fe_2O_3)$ above 5,000 and $Na_2O$ carbonate: $Al_2O_3$ above 0.60 no additional effect is observed. Therefore, the lime pulp of the above-specified composition employed as a desilication agent in the second stage of desilication makes it possible to obtain aluminate liquors with a very low content of $SiO_2$ and $Fe_2O_3$, namely: $SiO_2=0.01\text{-}0.02$ and $Fe_2O_3=0.008\text{-}0.01$.

The high degree of purification of aluminate liquors is explained by the fact that calcium hydroaluminates and hydrocarboaluminates present in the lime pulp upon introduction thereof into the aluminate liquor obtained in the first stage very rapidly react with impurities of $SiO_2$ and $Fe_2O_3$ dissolved therein with the formation of calcium hydrogarnets of the above-mentioned formula which are recovered in the form of a mud.

The recovered hydrogarnet slime is a useful product. We have found that this mud after a heat-treatment at a temperature within the range of from 250° to 600° C. acquires binding properties and can be successfully employed as a binder for the manufacture of cores and moulds in foundry shops of machine-building plants. This constitutes one of the most important advantages of the process for desilication of aluminate liquors according to the present invention.

Taking into consideration the fact that the reserves of bauxites are gradually exhausted and the production of alumina has to be shifted to the processing of non-bauxite raw materials, namely alkaline aluminosilicates, the importance of the present invention can be readily appreciated.

With the due account of a high degree of desilication of aluminate liquors and the formation of a useful product —hydrogarnet slime—it can be readily understood that the present invention is of a great commercial interest for two fields of application: production of alumina and manufacture of cores and moulds for foundry works in mechanical engineering.

For a better understanding of the present invention some specific examples illustrating the process for desilication of an aluminate liquor obtained from the production of alumina from alkaline aluminosilicate raw materials are given hereinbelow.

EXAMPLE 1

This example illustrates the following stages: (a) preparation of lime milk, (b) preparation of lime pulp, (c) desilication of aluminate liquor.

(a) Preparation of lime milk.

Limestone is calcined and the resulting lime is slaked by means of an aluminate liquor taken from the second stage of desilication and containing: 70 g/l of $Al_2O_3$, 0.16 g/l of $Fe_2O_3$, 0.02 g/l of $SiO_2$ and 17.5 g/l of $Na_2O$ carbonate. The slaking of lime is effected by means of the above-mentioned liquor so that 1 $m^3$ of the aluminate liquor be used for 176 kg of lime. On completi of slaking the undercalcined and non-slaked particles are separated. The thus-produced lime milk contains 150 g/l of active CaO.

(b) Preparation of lime pulp.

The lime milk produced as described hereinabove is mixed with the aluminate liquor taken after the second stage of desilication and having the composition specified in (a) /preparation of lime milk/. The above-mentioned components are mixed at such a volume ratio that per m³ of the aluminate liquor 0.25 m³ of lime milk is used. the mixture is stirred for 1 hour at the temperature of 60° C. In the thus-produced lime pulp the ratio of oxides CaO active:(SiO$_2$+Fe$_2$O$_3$)=1,200:1 and Na$_2$O carbonate:Al$_2$O$_3$=0.30:1 the content of active CaO is 36 g/l. The content of the solid phase in the pulp is 36 kg/m³.

(c) Desilication of aluminate liquor.

The starting aluminate liquor is the liquor obtained after digestion of a sinter of the aluminosilicate starting stock and containing about 3 g/l of SiO$_2$ and about 2 g/l of Fe$_2$O$_3$. This aluminate liquor is delivered to the first stage of desilication, wherein it is subjected to autoclaving at the temperature of 160° C. under a pressure of 8-10 atm. At this stage the impurities SiO$_2$ and Fe$_2$O$_3$ are combined into alkaline aluminosilicates which are recovered as a mud. As a result of such treatment the major portion of SiO$_2$ and Fe$_2$O$_3$ contaminants is removed.

The aluminate liquor after the removal of the mud contains 0.2 g/l of SiO$_2$ and 0.4 g/l of Fe$_2$O$_3$. This aluminate liquor is then delivered to the second stage of desilication.

In the 2-nd stage the aluminate liquor is treated at a temperature of 75° C. for 1.5 hours with a lime pulp having composition specified in the above item (b). The supply rate of the pulp is selected so as to ensure the content of 10 g/l of active CaO in the aluminate liquor, i.e. 0.28 m³ of the lime pulp is fed per m³ of the aluminate liquor. Upon the interaction of the pulp with the aluminate liquor, calcium hydroaluminates and hydrocarboaluminates incorporated in the pulp enter into reaction with the impurities of SiO$_2$ and Fe$_2$O$_3$ remaining in the aluminate liqur with the formation of calcium hydrogarnets of the formula: 3CaO(Al, Fe)$_2$O$_3$·mSiO$_2$(6−2m)·H$_2$O, wherein m=0.01-0.5, which are separated by filtration in the form of a hydrogarnet mud, while the purified aluminate liquor containing SiO$_2$ in the amount of 0.01 g/l and Fe$_2$O$_3$=0.008 g/l is delivered to a further processing for the production of alumina.

The recovered hydrogarnet mud is washed with water to remove water-soluble alkalis, dried and heat-treated at a temperature within the range of from 250° to 600° C. and then disintegrated. The resulting powder-like product is used as a cement for the manufacture of cores and moulds in the foundry engineering.

Examples 2, 3 and 4 are summarized in a table. The process of desilication in these Examples is conducted in a manner similar to that described in the foregoing Example 1, except that the lime milk and the pulp have different compositions, though within the range according to the present invention. For the purpose of comparison Example 5 is also given in the Table to illustrate the prior art desilication process as taught in USSR Inventor's Certificate No.325811.

As it is seen from the Table, the degree of purification from SiO$_2$ in the process according to the present invention is by 2.5-5 times higher, while the degree of purification from Fe$_2$O$_3$ is by 15 times higher as compared to the prior art process. This high degree of purification of aluminate liquors ensures alumina quality meeting the highest international standards.

TABLE

| Nos 1 | Example No. 2 | Content of CaO in the lime milk, g/l 3 | Content of oxides in the aluminate liquor after the 1st stage of desilication, g/l | | Ratio of oxides in the lime pulp | | Process parameters of the 2nd desilication stage | | Content of oxides in the aluminate liquor after the 2nd stage of desilication, g/l | |
|---|---|---|---|---|---|---|---|---|---|---|
| | | | SiO$_2$ 4 | Fe$_2$O$_3$ 5 | act. CaO SiO$_2$+Fe$_2$O$_3$ 6 | Na$_2$O car. Al$_2$O$_3$ 7 | Temperature, °C. 8 | Time, hours 9 | SiO$_2$ 10 | Fe$_2$O$_3$ 11 |
| 1 | 2 | 150 | 0.1 | 0.15 | 1,000 | 0.25 | 70 | 1 | 0.02 | 0.010 |
| 2 | 3 | 180 | 1.45 | 0.36 | 2,500 | 0.40 | 80 | 2 | 0.015 | 0.009 |
| 3 | 4 | 200 | 3.00 | 0.60 | 5,000 | 0.60 | 95 | 4 | 0.010 | 0.008 |
| 4 | 5 Prototype | 200 | 1.5 | 0.35 | 28 | 0.20 | 80 | 2 | 0.05 | 0.15 |

What is claimed is:

1. A process for desilication of aluminate liquors in the production of Alumina comprising two stages of desilication:
   (1) Heat-treating an aluminate liquor, obtained after digestion of a sinter, at a temperature of 150°-170° C. under a pressure of 6 to 12 atmospheres to remove the main portion of SiO$_2$ and Fe$_2$O$_3$ impurities in the form of an aluminosilicate mud which is separated;
   (2) Treating the aluminate liquor with a desilication agent which is a lime pulp containing oxides CaO, Al$_2$O$_3$, SiO$_2$, Fe$_2$O$_3$, NaO$_2$ in a mass ratio of CaO: (SiO$_2$+Fe$_2$O$_3$)=1,000-5,000:1 and Na$_2$O:Al$_2$O$_3$=0.25-0.60:1, said Na$_2$O being in the carbonate form, wherein CaO is active in an amount ensuring the content of active CaO in the aluminate liquor within the range of 5 to 10 g/l, whereby the remaining portion of SiO$_2$ and Fe$_2$O$_3$ impurities being removed, pass into the solid phase with the formation of calcium hydrogarnet of the formula: 3CaO·(Al, Fe)$_2$O$_3$·mSiO$_2$·(6−2m)·H$_2$O, wherein m=0.01-0.5, which is separated in the form of a mud.

2. A process according to claim 1, wherein desilication in the second stage is conducted at a temperature of 60°-95° C. under a normal pressure.

3. A process according to claim 1, wherein the desilication agent (lime pulp) is obtained by mixing a lime milk containing from 150 to 200 g/l CaO with an aluminate liquor obtained at the second desilication stage, the components being mixed to ensure the content of CaO in the pulp equal to between 70 and 90 g/l at a weight ratio of Ca: (SiO$_2$+Fe$_2$O$_3$)=1,000 to 5,000:1 and Na$_2$O: Al$_2$O$_3$=0.25 to 0.60:1, wherein CaO is active and Na$_2$O is in the carbonate form, and holding the mixture at stirring for 1 to 2 hours at a temperature of from 60° to 75° C.

* * * * *